(12) United States Patent
Lee et al.

(10) Patent No.: US 11,331,240 B2
(45) Date of Patent: May 17, 2022

(54) SUIT TYPE EXOSKELETON ADJUSTABLE TO USER'S BODY SIZE AND SUIT TYPE EXOSKELETON FOR KNEE POWER ASSISTANCE

(71) Applicant: Daegu Gyeongbuk Institute of Science and Technology, Daegu (KR)

(72) Inventors: Hee Don Lee, Daegu (KR); Jeon Il Moon, Seongnam-si (KR); Seong Ho Bak, Daejeon (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 619 days.

(21) Appl. No.: 16/189,575

(22) Filed: Nov. 13, 2018

(65) Prior Publication Data
US 2020/0022864 A1 Jan. 23, 2020

(30) Foreign Application Priority Data
Jul. 23, 2018 (KR) .......................... 10-2018-0085528

(51) Int. Cl.
*A61H 3/00* (2006.01)
*B25J 9/00* (2006.01)
(Continued)

(52) U.S. Cl.
CPC .................. *A61H 3/00* (2013.01); *A61H 1/00* (2013.01); *A61H 1/024* (2013.01); *A61H 1/0266* (2013.01);
(Continued)

(58) Field of Classification Search
CPC .......... A61H 1/00; A61H 1/02; A61H 1/0237; A61H 1/024; A61H 1/0262; A61H 1/0266;
(Continued)

(56) References Cited

U.S. PATENT DOCUMENTS

2007/0004570 A1* 1/2007 Afanasenko .............. A61F 5/01
482/124
2014/0046455 A1* 2/2014 Herr ..................... B62D 57/032
623/39
(Continued)

FOREIGN PATENT DOCUMENTS

| JP | 2016-123620 A | 7/2016 |
| KR | 10-2016-0147231 A | 12/2016 |
| KR | 10-1836413 B1 | 3/2018 |

OTHER PUBLICATIONS

Korean Office Action for Patent Application No. KR 10-2018-0085528 dated Sep. 5, 2019; 6 pages.

*Primary Examiner* — Tu A Vo
*Assistant Examiner* — Alexander Morales
(74) *Attorney, Agent, or Firm* — Harness, Dickey & Pierce, P.L.C.

(57) ABSTRACT

A suit type exoskeleton adjustable to a user's body size includes a wire, a wearing portion worn on a part of the user's body to assist with physical strength, a controller removably coupled to an outer surface of the wearing portion and coupled to an end of the wire, and a driver coupled to an opposite end of the wire and configured to provide power to the wire. A suit type exoskeleton for knee power assistance is characterized by use of the suit type exoskeleton which is adjustable to a user's body size for their knee.

15 Claims, 12 Drawing Sheets

(51) Int. Cl.
*A61H 1/02* (2006.01)
*A61H 1/00* (2006.01)

(52) U.S. Cl.
CPC ........... *B25J 9/0006* (2013.01); *B25J 9/0009* (2013.01); *A61H 2003/007* (2013.01); *A61H 2201/0192* (2013.01); *A61H 2201/12* (2013.01); *A61H 2201/164* (2013.01); *A61H 2201/165* (2013.01); *A61H 2201/1642* (2013.01); *A61H 2201/50* (2013.01); *A61H 2205/102* (2013.01)

(58) Field of Classification Search
CPC ................ A61H 3/00; A61H 2003/007; A61H 2201/0192; A61H 2201/12; A61H 2201/164; A61H 2201/1642; A61H 2201/165; A61H 2201/50; A61H 2205/102; B25J 9/0006; B25J 9/0009; B25J 9/14; A61F 5/01–0195; A61F 5/0106; A61F 5/0123; A61F 5/37; A61F 5/04; A61F 5/042; A61F 5/048; A61F 5/05841; A61F 5/0585; A61F 5/1023; A61F 5/1025; A61F 13/061; A61F 2005/0132; A61F 2005/0155; A63B 21/153; A63B 21/4011; A63B 21/4025; A63B 23/0494

USPC ......... 601/5, 33–35; 128/869, 882; 602/2, 5, 602/26, 32, 36, 62
See application file for complete search history.

(56) References Cited

U.S. PATENT DOCUMENTS

| | | | |
|---|---|---|---|
| 2014/0277739 A1* | 9/2014 | Kornbluh | A41D 1/005 700/260 |
| 2014/0330431 A1* | 11/2014 | Hollander | B25J 9/0006 700/245 |
| 2015/0073318 A1* | 3/2015 | Holschuh | B64G 6/00 601/84 |
| 2015/0173993 A1 | 6/2015 | Walsh et al. | |
| 2015/0290794 A1* | 10/2015 | Griffith | B25J 9/142 414/4 |
| 2016/0045339 A1* | 2/2016 | Mackiewicz | A61F 2/78 2/78.3 |
| 2017/0360645 A1 | 12/2017 | Sodeyama et al. | |
| 2018/0093374 A1* | 4/2018 | Holgate | B25J 9/1075 |
| 2018/0116851 A1 | 5/2018 | Lee | |
| 2018/0200096 A1* | 7/2018 | Jonsson | A61F 5/0109 |
| 2018/0369057 A1* | 12/2018 | John | A61F 2/78 2/78.3 |
| 2018/0370020 A1* | 12/2018 | Murakami | A61H 3/008 |

* cited by examiner

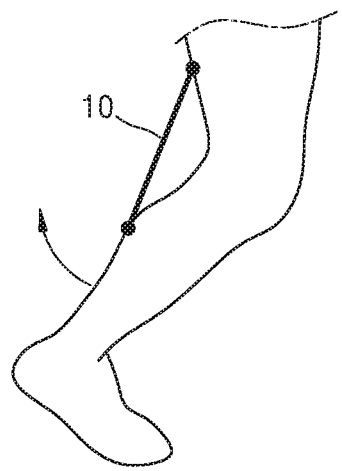
FIG. 10A
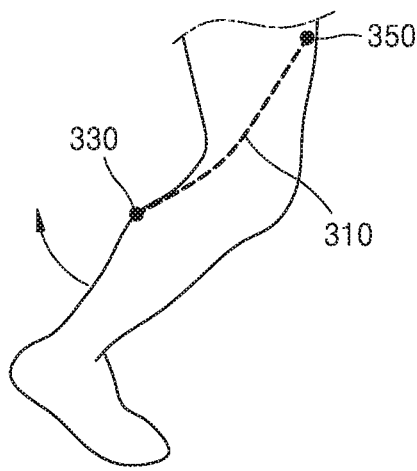
FIG. 10B
FIG. 11
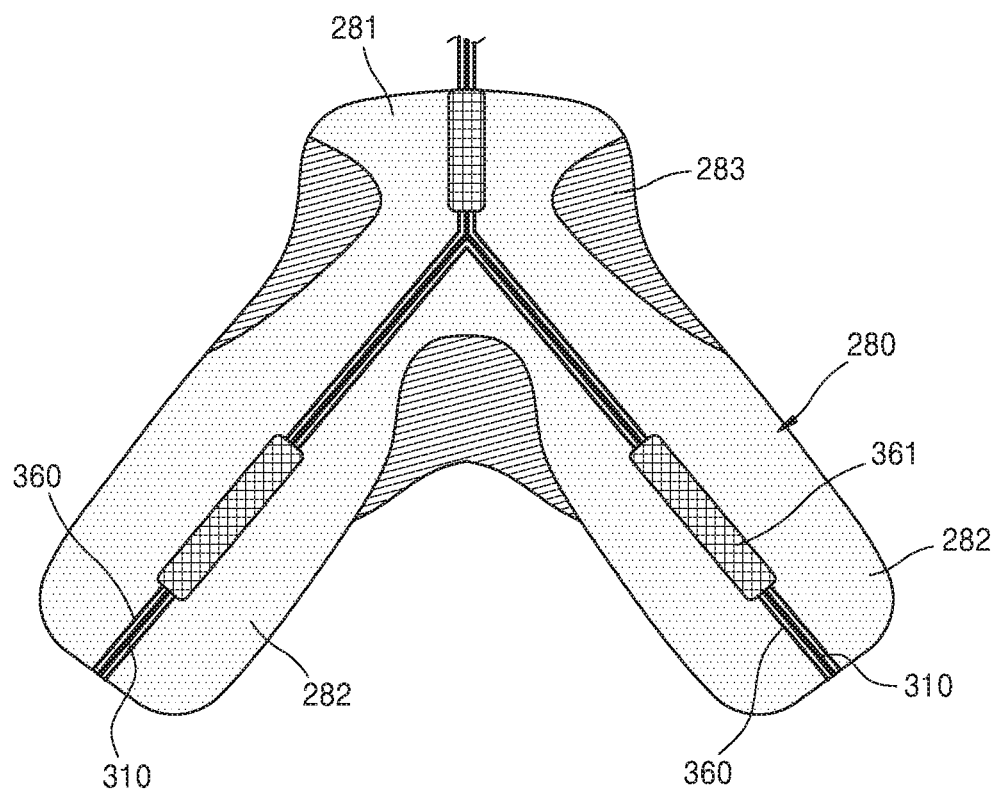

SUIT TYPE EXOSKELETON ADJUSTABLE TO USER'S BODY SIZE AND SUIT TYPE EXOSKELETON FOR KNEE POWER ASSISTANCE

CROSS-REFERENCE TO RELATED APPLICATION

This application claims priority to Korean Patent Application No. 10-2018-0085528, filed on Jul. 23, 2018, in the Korean Intellectual Property Office, the entirety of which is incorporated by reference herein.

BACKGROUND

1. Field

One or more embodiments relate to a suit type exoskeleton adjustable to a user's body size and a suit type exoskeleton for knee power assistance, and more particularly, to a suit type exoskeleton adjustable to a user's body size, whereby the wearing comfort of a user is increased as the position of a wire and the position of an end of a wire sheath is adjusted using a sheath fixing unit and a controller removable from a wearing portion, and a suit type exoskeleton for knee power assistance.

2. Description of the Related Art

Recently, suit type exoskeletons for assisting a user with physical strength have been developed. Suit type exoskeletons may assist a user's joints with power through a wire or webbing and include a driver for transmitting power to the wire or the webbing. The driver transmits power to the wire or the webbing and assists a user with physical strength through the wire or the webbing.

Such a suit type exoskeleton is fixed to a user's waist, thighs, calves, feet, etc. by straps and includes a controller enabling adjustment of the suit type exoskeleton according to the user's body size at each body part. However, suit type exoskeletons according to the related art have problems described below.

To assist a user with physical strength via a suit type exoskeleton, a wire or webbing transmitting the power of a driver needs to be attached to an accurate position on the body. However, since the body size of humans vary, it is difficult to attach the wire or webbing to an accurate position on the body of different users.

To overcome this problem, many straps are used and also many controllers are used to control the length of the straps. Thus, a suit type exoskeleton may be adjusted to various body sizes, but a user may feel uncomfortable due to the straps and controllers when wearing the suit type exoskeleton robot.

Moreover, when the straps are adjusted to the body size using the controllers, the length of wires or webbing transmitting the power of a driver also needs to be controlled. However, the suit type exoskeletons according to the related art do not include a separate device for controlling the length of the wires or webbing.

SUMMARY

One or more embodiments include a suit type exoskeleton adjustable to a user's body size, whereby the wearing comfort of a user is increased as the position of a wire and the position of an end of a wire sheath is adjusted using a sheath fixing unit and a controller removable from a wearing portion, and a suit type exoskeleton for knee power assistance.

Additional aspects will be set forth in part in the description which follows and, in part, will be apparent from the description, or may be learned by practice of the presented embodiments.

According to one or more embodiments, a suit type exoskeleton for knee power assistance includes a first wire; a second wire; a wearing portion configured to be worn on a knee from a front of the knee to assist with muscular strength of the knee; a first controller coupled to an end of the first wire and removably coupled to an outer surface of the wearing portion to be located in the front of the knee when the wearing portion is worn on the knee; a second controller coupled to an end of the second wire and removably coupled to the outer surface of the wearing portion to be located on a calf in a back of the knee when the wearing portion is worn on the knee; and a driver coupled to an opposite end of the first wire and an opposite end of the second wire and configured to provide power to the first wire and the second wire.

Two second controllers may be coupled to the outer surface of the wearing portion, the second wire may be coupled to each of the two second controllers, and the second wire may extend from the front of the knee to the calf in the back of the knee via a lateral side of the knee when the wearing portion is worn on the knee.

The suit type exoskeleton may further include a first sheath fixing unit removably coupled to the outer surface of the wearing portion to be located in the front of the knee when the wearing portion is worn on the knee and including a first through hole through which the first wire passes; and a second sheath fixing unit removably coupled to the outer surface of the wearing portion to be located in the front of the knee when the wearing portion is worn on the knee and including a second through hole through which the second wire passes.

The suit type exoskeleton may further include a first sheath having an end coupled to the driver, an opposite end coupled to the first sheath fixing unit, and a tubular shape; and a second sheath having an end coupled to the driver, an opposite end coupled to the second sheath fixing unit, and a tubular shape. The first wire may pass through an inside of the first sheath and extend from the first sheath fixing unit to the driver, and the second wire may pass through an inside of the second sheath and extend from the second sheath fixing unit to the driver.

The first sheath may extend to a front of a kneecap of the knee when the wearing portion is worn on the knee.

The suit type exoskeleton may further include a plurality of fixing portions attached to the wearing portion. The fixing portions may cover the first controller, the second controller, the first sheath fixing unit, and the second sheath fixing unit when attached to the wearing portion.

The first wire may be connected to the second wire inside the driver.

The suit type exoskeleton may further include a buttress. The buttress may include a first supporting portion fixed to the wearing portion to be located in the front of the knee when the wearing portion is worn on the knee; and a second supporting portion extending in two branches from the first supporting portion and fixed to the wearing portion to be located on lateral sides of the knee when the wearing portion is worn on the knee.

The suit type exoskeleton may further include an ankle portion configured to be worn on an ankle. An upper portion of the ankle portion may be connected to a lower portion of the wearing portion through a strap. The strap may include a strap adjuster configured to adjust a length of the strap.

The first controller may control a length of the first wire by winding or unwinding the first wire, and the second controller may control a length of the second wire by winding or unwinding the second wire.

According to one or more embodiments, a suit type exoskeleton adjustable to a user's body size includes a wire; a wearing portion configured to be worn on a part of the user's body to assist with physical strength; a controller removably coupled to an outer surface of the wearing portion and coupled to an end of the wire; and a driver coupled to an opposite end of the wire and configured to provide power to the wire.

The suit type exoskeleton may further include a sheath fixing unit removably coupled to the outer surface of the wearing portion and including a through hole through which the wire passes.

The suit type exoskeleton may further include a sheath having an end coupled to the driver, an opposite end coupled to the sheath fixing unit, and a tubular shape. The wire may pass through an inside of the sheath and extend from the sheath fixing unit to the driver.

The suit type exoskeleton may further include a plurality of fixing portions attached to the wearing portion. The fixing portions may cover the controller and the sheath fixing unit when attached to the wearing portion.

The controller may control a length of the wire by winding or unwinding the wire.

BRIEF DESCRIPTION OF THE DRAWINGS

These and/or other aspects will become apparent and more readily appreciated from the following description of the embodiments, taken in conjunction with the accompanying drawings in which:

FIG. 10A is a diagram of a wire extending in the back of the knee;

FIG. 10B is a diagram of a second wire according to an embodiment;

FIG. 11 is a diagram of a buttress according to an embodiment;

DETAILED DESCRIPTION

Figure 1:
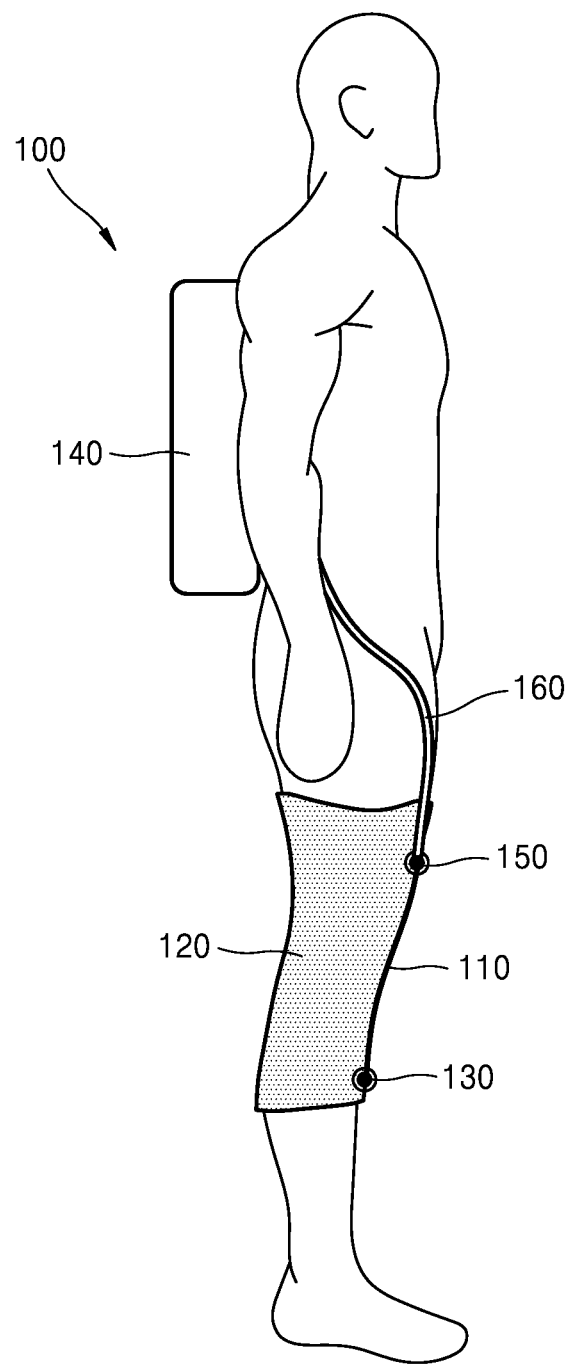
FIG. 1 is a diagram of a suit type exoskeleton adjustable to a user's body size, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

The term "comprises" and/or "may comprise" is used to specify the presence of a function, an operation, or an element and do not put a limit on at least one additional function, operation, or element. It will be understood that the term "comprises" or "has" specifies the presence of a feature, a figure, a step, an operation, an element, a component, or a combination thereof but do not preclude the presence or addition of one or more other features, figures, steps, operations, element, components, or combinations thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present disclosure. As used herein, the singular forms are intended to include the plural forms as well, unless the context clearly indicates otherwise.

Unless otherwise defined, all terms (including technical and scientific terms) used herein have the same meaning as commonly understood by one of ordinary skill in the art to which this invention belongs.

It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

In the descriptions below, a wire may be a wire that is used to transmit power or may be webbing. Besides, a wire may be implemented as a string that can transmit power. The term "wire" will be used as a standardized term in the descriptions below.

One or more embodiments relate to a suit type exoskeleton adjustable to a user's body size and a suit type exoskeleton for knee power assistance, and more particularly, to a suit type exoskeleton adjustable to a user's body size, whereby the comfort of a user is increased as the position of a wire and the position of an end of a wire sheath may be adjusted using a sheath fixing unit and a controller removable from a wearing portion, and a suit type exoskeleton for knee power assistance. Hereinafter, embodiments of the present disclosure will be described in detail with reference to the attached drawings.

Referring to FIG. 1, a suit type exoskeleton 100 adjustable to a user's body size may include a wire 110, a wearing portion 120, a controller 130, and a driver 140.

The wire 110 may transmit power of the driver 140 to the body. The wire 110 may include webbing. The wire 110 may include various materials as far as the wire 110 may have a string shape and transmit the power of the driver 140 to the body.

The wearing portion 120 is worn on a part of the body to assist the user with physical strength. The wearing portion 120 may be wrapped around the body part when worn on the body. The wearing portion 120 may be worn on the body part requiring power assistance. For example, the wearing portion 120 may be worn on a knee, an ankle, or the like. The wearing portion 120 may be worn on various body parts requiring power assistance. The wearing portion 120 may be worn on a knee for knee power assistance, which will be described below.

The wearing portion 120 may include an elastic material, so that the user may not feel uncomfortable since the wearing portion 120 stretches along the curves of the body.

Figure 2A:
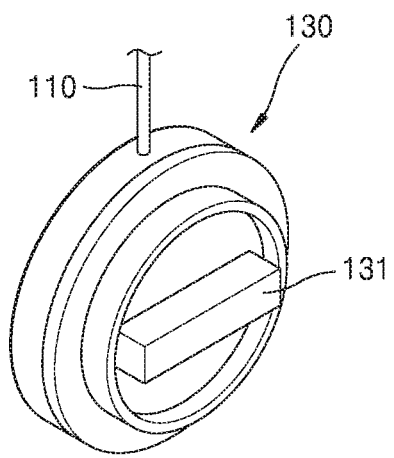
FIG. 2A is a diagram of a controller according to an embodiment.

Referring to FIG. 2A, the controller 130 may be removably coupled to an outer surface of the wearing portion 120 and may be coupled to an end of the wire 110. The controller 130 may be attached to a spot on the outer surface of the wearing portion 120 and may be detached thereafter.

Since the controller 130 is removably coupled to the wearing portion 120, the controller 130 may be located at a desired area. Since body size varies in humans, a position where the wire 110 is located to assist with physical strength also varies. Since the controller 130 is attachable to and detachable from the wearing portion 120, the location of the wire 110 may be freely changed according to the body size.

Various methods may be used to allow the controller 130 to be attachable to and detachable from the wearing portion 120. For example, velcro may be attached on a surface of the controller 130, and the controller 130 may be removably coupled to the wearing portion 120 via the velcro.

An end of the wire 110 may be coupled to the controller 130. Since the end of the wire 110 is coupled to the controller 130, the location of the wire 110 may be changed when the location of the controller 130 is changed.

The controller 130 may control the length of the wire 110 by winding or unwinding the wire 110. The end of the wire 110 is fixedly coupled to the controller 130, but the wire 110 may be wound onto or unwound from the controller 130.

The length of the wire 110 may be controlled by winding the wire 110 onto or unwinding the wire 110 from the controller 130. Since body size varies in humans, it is necessary to increase or decrease the length of the wire 110 according to the body size. The controller 130 may increase of decrease the length of the wire 110 by winding or unwinding the wire 110.

Referring to FIG. 2A, the controller 130 may include a dial 131. The wire 110 may be wound or unwound using the dial 131. In detail, the dial 131 may be connected to a spindle around which the wire 110 is wound, and the wire 110 may be wound or unwound by turning the dial 131.

It is desirable that the wire 110 is fixed not to be wound onto or unwound from the controller 130 when the driver 140 provides power to the wire 110. Accordingly, after the length of the wire 110 is adjusted by winding or unwinding the wire 110 using the controller 130, the wire 110 needs to be fixed not to be wound or unwound.

Accordingly, it is desirable that the wire 110 is allowed to be wound or unwound only when the dial 131 is turned and that the wire 110 is fixed not to be wound or unwound when the dial 131 is not turned.

The driver 140 may be coupled to an opposite end of the wire 110 and may provide power to the wire 110. The driver 140 may provide power that may pull or push the wire 110. The suit type exoskeleton 100 may assist with physical strength by providing power to the wire 110 using the driver 140. The driver 140 may be provided outside the body. The driver 140 may be worn on the body and desirably worn on the back of the body.

Figure 2B:
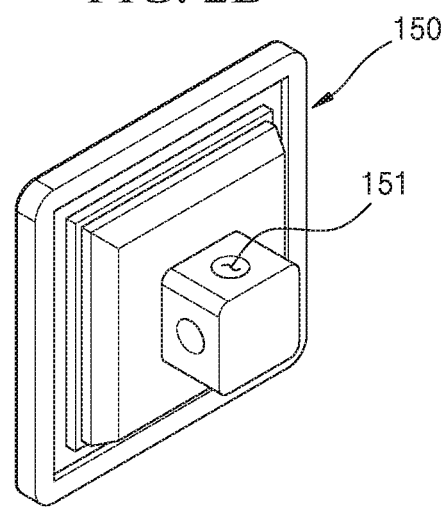
FIG. 2B is a diagram of a sheath fixing unit according to an embodiment.

Referring to FIG. 2B, the suit type exoskeleton 100 adjustable to the user's body size may further include a sheath fixing unit 150. The sheath fixing unit 150 may be removably coupled to the outer surface of the wearing portion 120 and may include a through hole 151 through which the wire 110 may pass.

The sheath fixing unit 150 may form a path along which the wire 110 passes. In detail, the sheath fixing unit 150 may be located on the path along which the wire 110 is supposed to pass, and the wire 110 may pass through the through hole 151, so that the path of the wire 110 may be formed. Only one sheath fixing unit 150 may be used. Alternatively, a plurality of sheath fixing units 150 may be used to form the path of the wire 110.

Since the sheath fixing unit 150 is removably coupled to the wearing portion 120, the path of the wire 110 may be easily changed according to the body size.

Various methods may be used to allow the sheath fixing unit 150 to be attachable to and detachable from the wearing portion 120. For example, velcro may be attached on a surface of the sheath fixing unit 150, and the sheath fixing unit 150 may be removably coupled to the wearing portion 120 via the velcro.

A sheath 160 may be provided between the driver 140 and the sheath fixing unit 150. The sheath 160 may have an end coupled to the driver 140 and an opposite end coupled to the sheath fixing unit 150. The sheath 160 may have a tubular shape. The sheath 160 may enclose the wire 110. The wire 110 may pass through the inside of the sheath 160 to extend from the sheath fixing unit 150 to the driver 140.

The sheath 160 is provided to prevent the body from being pressed by the wire 110. When the driver 140 transmits power to the wire 110, the wire 110 may press down the body and thus cause the user to feel uncomfortable or pain. For this reason, the wire 110 may be enclosed in the sheath 160, and the sheath 160 may include an elastic material and prevent the wire 110 from pressing the body. The sheath 160 extends from the driver 140 to the sheath fixing unit 150 but may extend further below the sheath fixing unit 150 when necessary.

Figure 3:
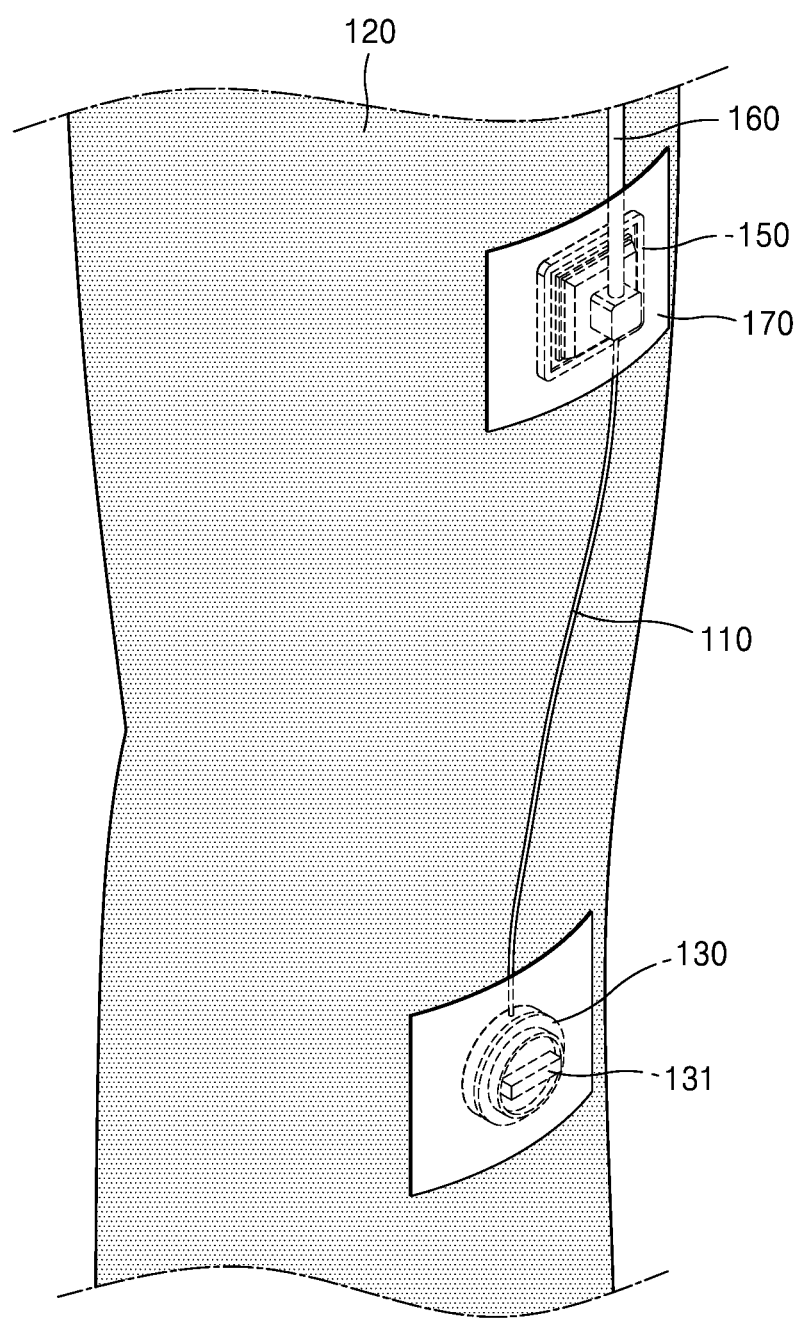
FIG. 3 is a diagram of a state in which a controller and a sheath fixing unit are double fixed using a fixing portion, according to an embodiment.

Referring to FIG. 3, the suit type exoskeleton 100 may include a plurality of fixing portions 170 attached to the wearing portion 120. The fixing portions 170 may cover the controller 130 and the sheath fixing unit 150 when attached to the wearing portion 120. Due to the fixing portions 170, the controller 130 and the sheath fixing unit 150 may be prevented from being separated from the wearing portion 120.

As described above, the controller 130 and the sheath fixing unit 150 are removably coupled to the wearing portion 120 and may thus be separated from the wearing portion 120 during use of the suit type exoskeleton 100. When the fixing portions 170 are attached to the wearing portion 120 while covering the controller 130 and the sheath fixing unit 150, the controller 130 and the sheath fixing unit 150 may be double-fixed to the wearing portion 120 due to the fixing portions 170.

The fixing portions 170 may include velcro. The controller 130 and the sheath fixing unit 150 may be securely fixed by attaching the fixing portions 170 including velcro to the wearing portion 120.

When the suit type exoskeleton 100 is used, the wearing portion 120 may be put on a body part requiring power assistance. At this time, since body size varies in humans, the location and length of the wire 110 need to be controlled.

Since the controller 130 and the sheath fixing unit 150 are removably coupled to the location of the wire 110 may be controlled by changing positions at which the controller 130 and the sheath fixing unit 150 are respectively coupled to the wearing portion 120. The length of the wire 110 may be controlled by winding or unwinding the wire 110 in the controller 130.

As described above, when the location and length of the wire 110 is controlled according to the body size, the power of the driver 140 may be transmitted to an accurate position of the body requiring power assistance.

The suit type exoskeleton 100 may be used for various body parts including a knee. According to an embodiment, a suit type exoskeleton 200 for knee power assistance is an example of the suit type exoskeleton 100 adjustable to the user's body size. Hereinafter, the suit type exoskeleton 200 for knee power assistance will be described.

The suit type exoskeleton 200 may include a first wire 210 and a second wire 310 that may be the same as the wire 110. The first wire 210 may be used for the front of the knee and the second wire 310 may be used for the back of the knee.

The suit type exoskeleton 200 may further include a first controller 230 and a second controller 330 that may be the same as the controller 130, a first sheath fixing unit 250 and a second sheath fixing unit 350 that may be the same as the sheath fixing unit 150, and a first sheath 260 and a second sheath 360 that may be the same as the sheath 160.

Accordingly, the detailed descriptions of the first and second controllers 230 and 330, the first and second sheath fixing units 250 and 350, and the first and second sheaths 260 and 360 will be omitted below.

Figure 4:
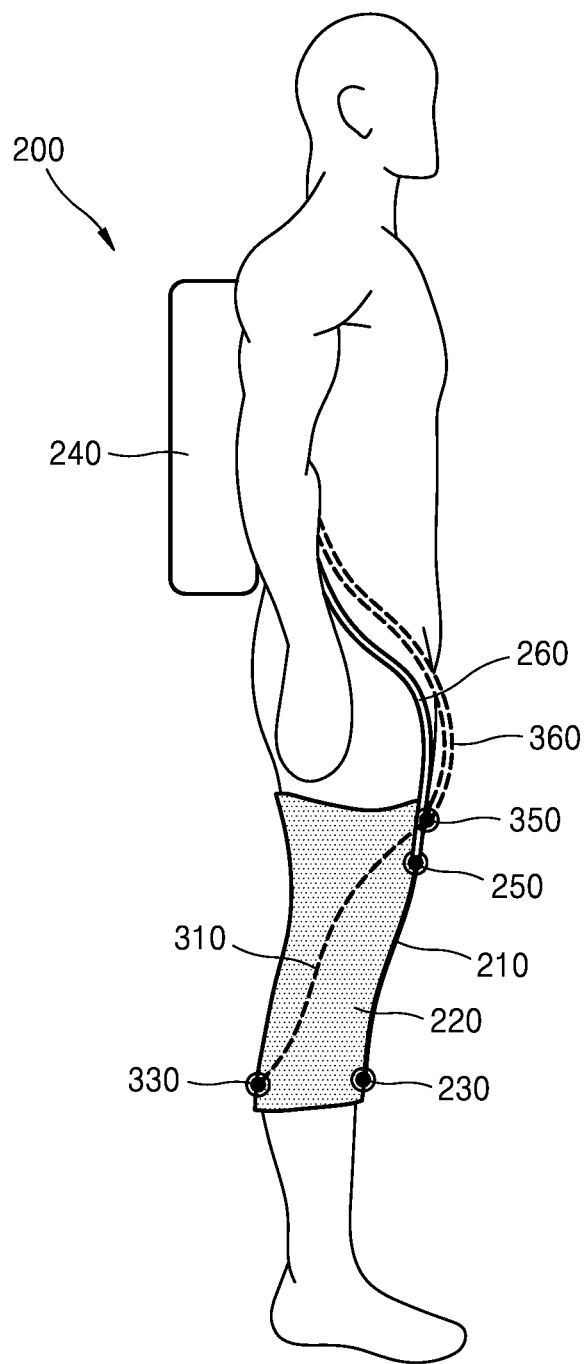
FIG. 4 is a side view of a state in which a suit type exoskeleton for knee power assistance is worn on the body, according to an embodiment.
Figure 5:
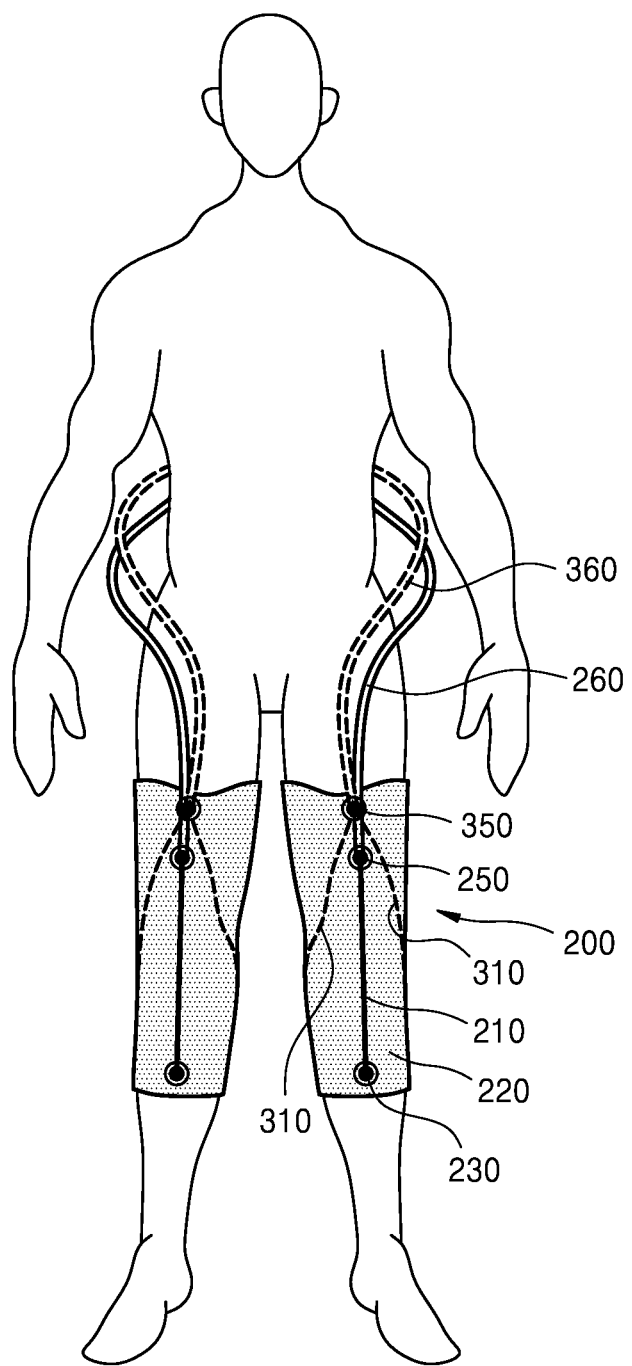
FIG. 5 is a front view of a state in which a suit type exoskeleton for knee power assistance is worn on the body, according to an embodiment.
Figure 6:
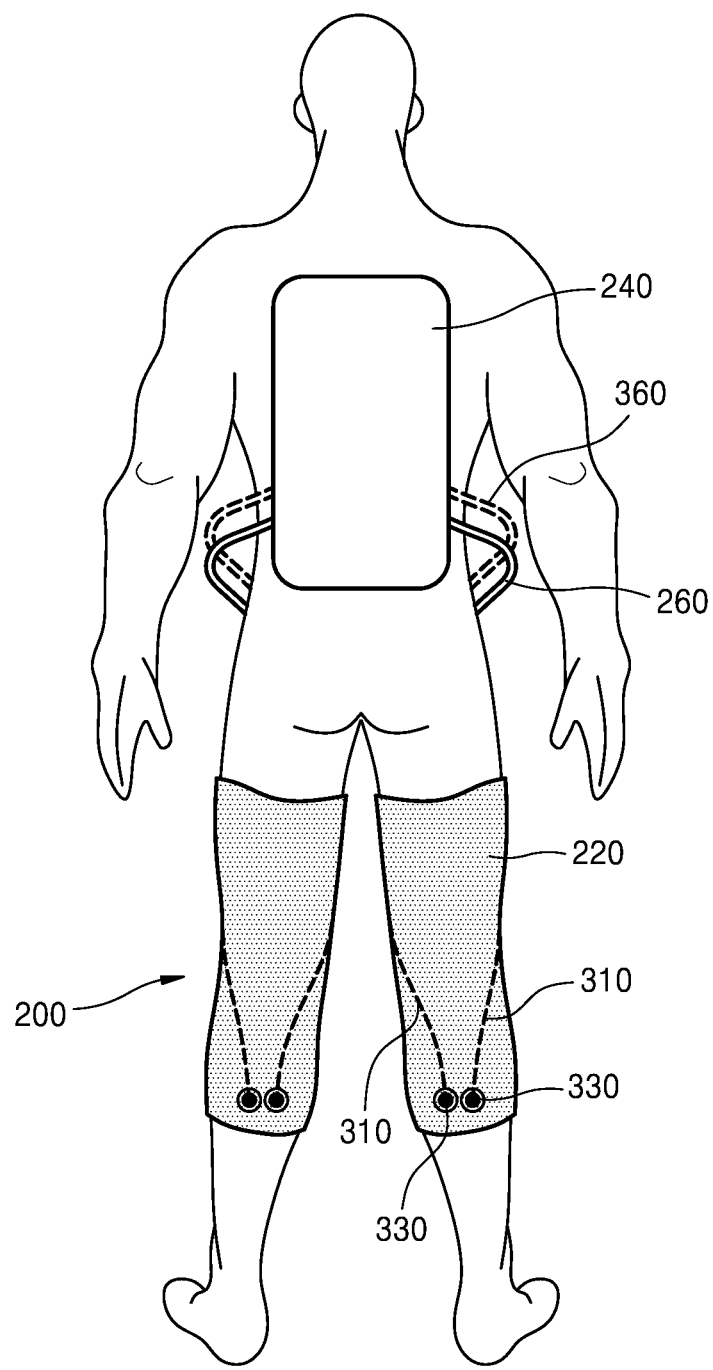
FIG. 6 is a rear view of a state in which a suit type exoskeleton for knee power assistance is worn on the body, according to an embodiment.

Referring to FIGS. 4 through 6, the suit type exoskeleton 200 may further include the first wire 210, the second wire 310, a wearing portion 220, the first controller 230, the second controller 330, and a driver 240.

FIGS. 4 through 6 are respectively side, front, and rear views of a state in which the suit type exoskeleton 200 for knee power assistance is worn on the body, according to an embodiment.

The first wire 210 and the second wire 310 may transmit power of the driver 240 to the knee. The first wire 210 and the second wire 310 may include webbing. The first wire 210 and the second wire 310 may include materials as far as the first wire 210 and the second wire 310 may have a string shape and transmit the power of the driver 240 to the body.

An end of the first wire 210 may be located in the front of the knee to assist the front of the knee with muscular strength. An end of the second wire 310 may be located on the calf in the back of the knee to assist the back of the knee with muscular strength. In other words, the first wire 210 may be a front wire and the second wire 310 may be a back wire.

The first wire 210 and the second wire 310 may operate in antagonism with each other. When a pulling force is applied to the first wire 210, a stretching force may be applied to the second wire 310. When a pulling force is applied to the second wire 310, a stretching force may be applied to the first wire 210.

An opposite end of the first wire 210 and an opposite end of the second wire 310 may be coupled to the driver 240 and may receive power from the driver 240. The first wire 210 may be connected to the second wire 310 inside the driver 240.

When the first wire 210 and the second wire 310 are connected to each other inside the driver 240, the first wire 210 and the second wire 310 may operate in antagonism with each other. In detail, the second wire 310 connected to the first wire 210 may be stretched when the first wire 210 is pulled, and the first wire 210 connected to the second wire 310 may be stretched when the second wire 310 is pulled.

The first wire 210 and the second wire 310 work on the same principle as muscular forces of the front and the back of the knee. Due to the antagonism between the first wire 210 and the second wire 310, the first wire 210 and the second wire 310 may assist the knee with muscular force.

Figure 7:
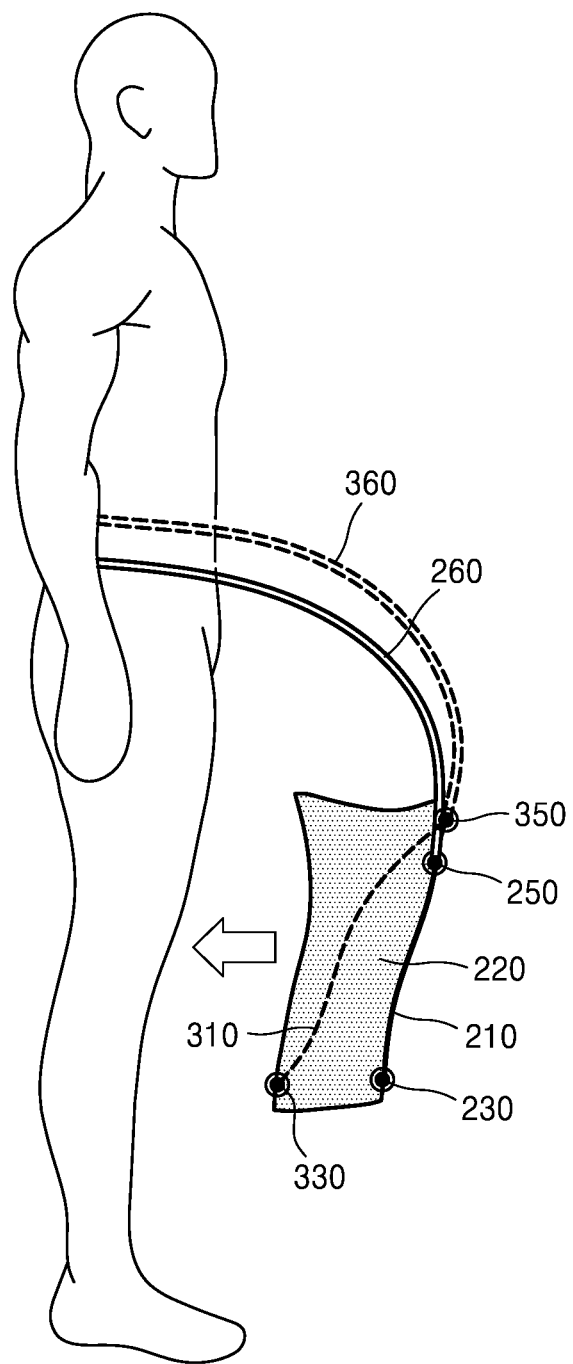
FIG. 7 is a diagram of a wearing portion worn on the front of the knee, according to an embodiment.
Figure 8:
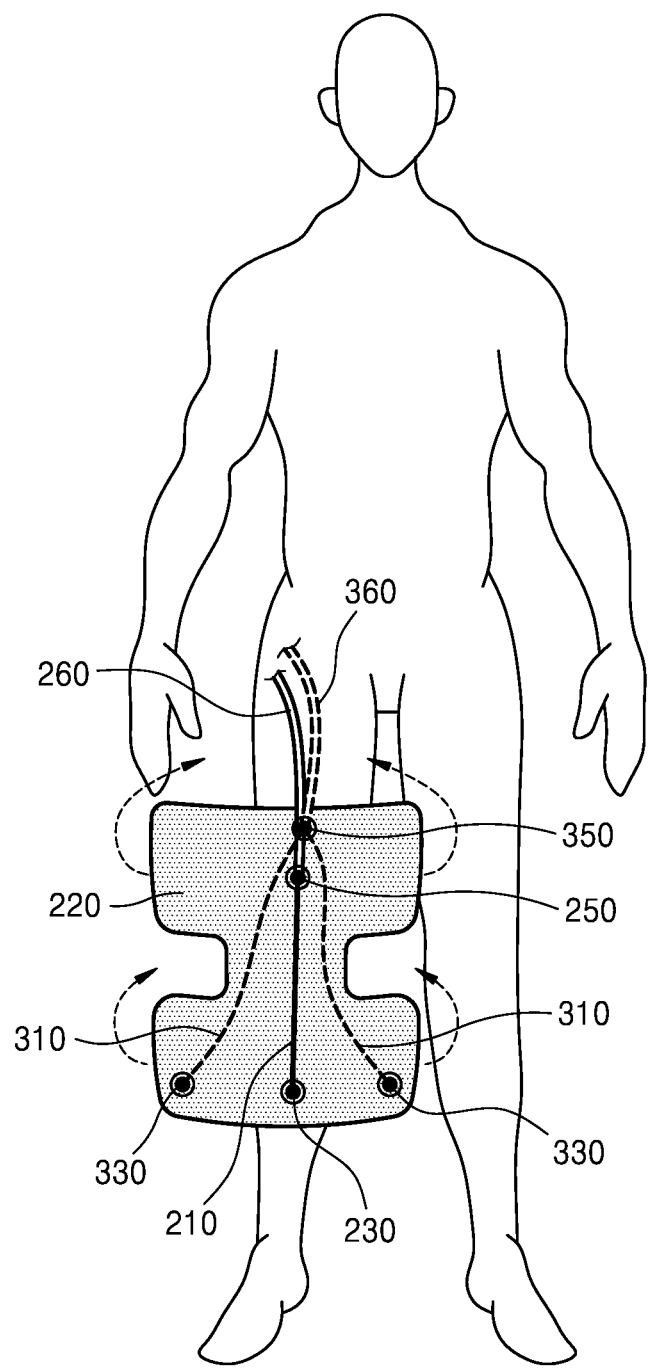
FIG. 8 is a diagram of a wearing portion worn on the front of the knee, according to an embodiment.

Referring to FIGS. 7 and 8, the wearing portion 220 may be put on the knee for knee power assistance. The wearing portion 220 may be put first on the front of the knee and wrapped around the knee, so that a user may easily wear the wearing portion 220. The wearing portion 220 may include an elastic material, so that a user may not be uncomfortable since the wearing portion 220 stretches along the curves of the body.

Figure 9:
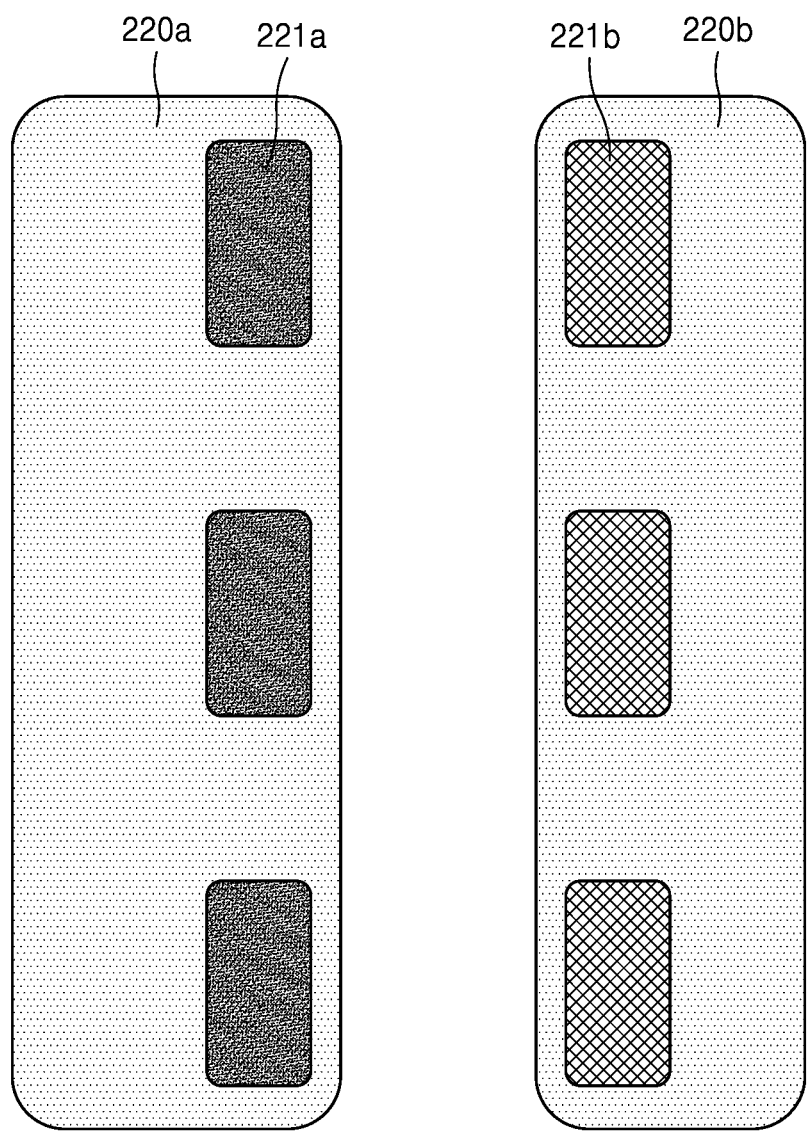
FIG. 9 is a diagram of the opposite sides of a wearing portion, according to an embodiment.

Referring to FIG. 9, the wearing portion 220 may be worn on the knee using velcro strips 221*a* and 221*b*. The velcro strip 221*a* may be provided on a bottom surface 220*a* of one side of the wearing portion 220, and the velcro strip 221*b* may be provided on a top surface 220*b* of an opposite side of the wearing portion 220. After the wearing portion 220 is put on the front of the knee and wrapped around the knee, the velcro strip 221*a* on the bottom surface 220*a* of one side of the wearing portion 220 may be fastened to the velcro strip 221*b* on the top surface 220*b* of the opposite side of the wearing portion 220, so that the wearing portion 220 may be worn on the knee.

The first controller 230 may be removably coupled to an outer surface of the wearing portion 220 such that the first controller 230 may be located in the front of the knee when the wearing portion 220 is worn on the knee. The end of the first wire 210 may be coupled to the first controller 230. The first controller 230 may have the same structure as the controller 130 and may be attached to and then detached from the wearing portion 220.

The second controller 330 may be removably coupled to the outer surface of the wearing portion 220 such that the second controller 330 may be located on the calf in the back of the knee when the wearing portion 220 is worn on the knee. The end of the second wire 310 may be coupled to the second controller 330. The second controller 330 may have the same structure as the controller 130 and may be attached to and then detached from the wearing portion 220.

The first wire 210 may be coupled to the first controller 230 and extend upward to the front of the knee. The second wire 310 may be coupled to the second controller 330 and extend upward from the calf in the back of the knee.

Two second controllers 330 may be coupled to the outer surface of the wearing portion 220, and two second wires 310 may be respectively coupled to the second controllers 330. In other words, two second wires 310 and two second controllers 330 may be provided to be symmetrical with respect to the center of the calf.

Referring to FIG. 10B, when the wearing portion 220 is worn on the knee, each of the second wires 310 may extend from the front of the knee to the calf in the back of the knee via a lateral side of the knee.

Referring to FIG. 10A, in a suit type exoskeleton for knee power assistance according to the related art, a back wire 10 may extend only in the back of the knee. When the back wire 10 extends only in the back of the knee, a user may be uncomfortable since a body part may be caught in the back wire 10 when the suit type exoskeleton is worn.

However, according to an embodiment of the present disclosure, the second wire 310 of the suit type exoskeleton 200 extends from the front of the knee to the calf in the back of the knee via a lateral side of the knee, and two second wires 310 are arranged symmetrically with respect to the center of the calf. Accordingly, extension of a wire upward only in the back of the knee may be avoided.

In other words, according to an embodiment, the suit type exoskeleton 200 may not include the back wire 10 to increase the comfort of the user, and the back of the suit type exoskeleton 200 may be open due to the two second wires 310 which extend from the front of the knee to the back of the knee. These features allow the user to quickly and correctly wear the suit type exoskeleton 200.

In addition, since the first and second controllers 230 and 330 are removably coupled to the wearing portion 220, the first and second controllers 230 and 330 may be located at desired areas. Since body size varies in humans, the location of a wire for physical strength assistance also varies. Since the first and second controllers 230 and 330 are detachable after being attached to the wearing portion 220, the locations of the first and second wires 210 and 310 may be freely changed according to the body size.

The first and second controllers 230 and 330 may control the lengths of the first and second wires 210 and 310, respectively, by winding or unwinding the first and second wires 210 and 310, respectively.

As described above, the lengths of the first and second wires 210 and 310 may be controlled by winding or unwinding the first and second wires 210 and 310 in the first and second controllers 230 and 330, respectively. Since body size varies in humans, it is necessary to increase or decrease the length of a wire according to the body size. The first and second controllers 230 and 330 may increase or decrease the lengths of the first and second wires 210 and 310, respectively, by winding or unwinding the first and second wires 210 and 310, respectively.

The first and second controllers 230 and 330 may have the same structure as the controller 130 of FIG. 2A. The first and second controllers 230 and 330 may each include a dial.

The opposite end of the first wire 210 and the opposite end of the second wire 310 may be coupled to the driver 240. The driver 240 may provide power to the first and second wires 210 and 310. As described above, the first wire 210 may be connected to the second wire 310 in the driver 240.

The muscular strength of the knee may be assisted when power is provided to the first and second wires 210 and 310 using the driver 240. The driver 240 may be provided outside the body and worn on the body. Desirably, the driver 240 may be worn on a user's back.

The suit type exoskeleton 200 may further include the first sheath fixing unit 250 and the second sheath fixing unit 350. The first and second sheath fixing units 250 and 350 may be the same as the sheath fixing unit 150. The first and second sheath fixing units 250 and 350 may be removably coupled to the outer surface of the wearing portion 220. The first sheath fixing unit 250 may include a first through hole through which the first wire 210 passes, and the second sheath fixing unit 350 may include a second through hole through which the second wire 310 passes.

The first and second sheath fixing units 250 and 350 may form paths along which the first and second wires 210 and 310 respectively pass. In detail, the first and second sheath fixing units 250 and 350 may be located on paths along which the first and second controllers 230 and 330 are respectively supposed to pass, and the first and second controllers 230 and 330 may respectively pass through the first and second through holes, so that the paths of the first and second controllers 230 and 330 may be formed.

As described above, since the first wire 210 extends in the front of the knee, it is desirable that the first sheath fixing unit 250 is located in the front of the knee when the wearing portion 220 is worn on the knee. The first wire 210 extends from the first controller 230 to the driver 240 via the first through hole of the first sheath fixing unit 250.

As described above, since the second wire 310 extends from the front of the knee to the calf in the back of the knee via a lateral side of the knee, it is desirable that the second sheath fixing unit 350 is located in the front of the knee. In detail, the second wire 310 extends from the second controller 330 located on the calf in the back of the knee and passes through the second through hole of the second sheath fixing unit 350 located in the front of the knee, so that the second wire 310 may extend from the front of the knee to the calf in the back of the knee via a lateral side of the knee.

When the wearing portion 220 is worn on the knee, the second sheath fixing unit 350 may be located on a lateral side of the knee. In other words, the second sheath fixing unit 350 may be located on a path along which the second wire 310 passes, so that the second sheath fixing unit 350 may be located on each of the front and lateral side of the knee when the wearing portion 220 is worn on the knee. Only one of each of the first and second sheath fixing units 250 and 350 may be used, but a plurality of first sheath fixing units 250 and a plurality of second sheath fixing units 350 may be used according to the paths of the first and second wires 210 and 310.

Since the first and second sheath fixing units 250 and 350 are removably coupled to the wearing portion 220, the paths of the first and second wires 210 and 310 may be easily changed according to the body size.

The first sheath 260 may be provided between the driver 240 and the first sheath fixing unit 250. The second sheath 360 may be provided between the driver 240 and the second sheath fixing unit 350.

The first sheath 260 may have an end coupled to the driver 240 and an opposite end coupled to the first sheath fixing unit 250 and have a tubular shape. The first sheath 260 may enclose the first wire 210. The first wire 210 may pass through the inside of the first sheath 260 and extend from the first sheath fixing unit 250 to the driver 240.

The second sheath 360 may have an end coupled to the driver 240 and an opposite end coupled to the second sheath fixing unit 350 and have a tubular shape. The second sheath 360 may enclose the second wire 310. The second wire 310 may pass through the inside of the second sheath 360 and extend from the second sheath fixing unit 350 to the driver 240.

The first and second sheaths 260 and 360 are provided to prevent the body from being pressed by the first and second wires 210 and 310. When the driver 240 transmits power to the first and second wires 210 and 310, the first and second wires 210 and 310 may press down the body and thus cause the user to feel uncomfortable or pain. For this reason, the first and second wires 210 and 310 may be respectively enclosed in the first and second sheaths 260 and 360, and the first and second sheaths 260 and 360 may include an elastic material and prevent the first and second wires 210 and 310 from pressing the body. The first and second sheaths 260 and 360 extend from the driver 240 to the first and second sheath fixing units 250 and 350, respectively, but may extend further below the first and second sheath fixing units 250 and 350, respectively, when necessary.

In an embodiment, the suit type exoskeleton 200 for knee power assistance may further include a plurality of fixing portions attached to the wearing portion 220. The fixing portions may be the same as the fixing portions 170 in FIG. 3 and may cover the first and second controllers 230 and 330 and the first and second sheath fixing units 250 and 350 when attached to the wearing portion 220.

Due to the fixing portions, the first and second controllers 230 and 330 and the first and second sheath fixing units 250 and 350 may be prevented from being separated from the wearing portion 220. The fixing portions may enable the first and second controllers 230 and 330 and the first and second sheath fixing units 250 and 350 to be double fixed to the wearing portion 220.

Referring to FIG. 11, the suit type exoskeleton 200 for knee power assistance may further include a buttress 280 fixedly attached to the wearing portion 220. The buttress 280 may include a first supporting portion 281, which is fixed to the wearing portion 220 to be located in the front of the knee when the wearing portion 220 is worn on the knee, and a second supporting portion 282, which extends in two branches from the first supporting portion 281 and is fixed to the wearing portion 220 to be located in the lateral sides of the knee when the wearing portion 220 is worn on the knee.

The buttress 280 may prevent the skin from being pressed by the first and second wires 210 and 310 and may include interlining or a stiff synthetic material with rigidity. The buttress 280 may also be used to guide the second wire 310 and the second sheath 360, which extend from the front of the knee to the calf in the back of the knee via a lateral side of the knee.

The first supporting portion 281 may be fixed to the wearing portion 220 to be located in the front of the knee. The first supporting portion 281 may be fixedly attached to the wearing portion 220 using velcro. The first wire 210 and the first sheath 260 may be located on the first supporting portion 281. The second wire 310 and the second sheath 360, which extend from the front of the knee, may also be located on the first supporting portion 281.

The second supporting portion 282 may be fixed to the wearing portion 220 to extend in two branches from a lower end of the first supporting portion 281 and to be located in the lateral sides of the knee. The second supporting portion 282 may be fixed to the wearing portion 220 using velcro or a buckle. Two second wires 310 and two second sheaths 360 may be located on the second supporting portion 282 extending in two branches. In other words, the second supporting portion 282 may prevent the skin from being pressed by the second wires 310, which extend to the calf in the back of the knee via the lateral sides of the knee.

As shown in FIG. 11, an elastic portion 283 may be provided between the first supporting portion 281 and the second supporting portion 282 or between two branches of the second supporting portion 282. The elastic portion 283 may include an elastic material. When the elastic portion 283 is provided between the first supporting portion 281 and the second supporting portion 282 or between two branches of the second supporting portion 282, the buttress 280 may be in tight contact with the skin when the knee is either bent or stretched.

The second sheath 360 may extend below the second sheath fixing unit 350 and across the second supporting portion 282 of the buttress 280. The second sheath 360 may extend from the driver 240 to the second supporting portion 282 of the buttress 280 via the second sheath fixing unit 350 to prevent the skin from being pressed by the second wire 310.

When the second sheath 360 extends across the buttress 280, the second sheath 360 may be fixed to the buttress 280. In an embodiment, a second covering member 361 may be put on the second sheath 360 and then sewn onto the buttress 280, so that the second sheath 360 may be fixed to the buttress 280.

Figure 12:
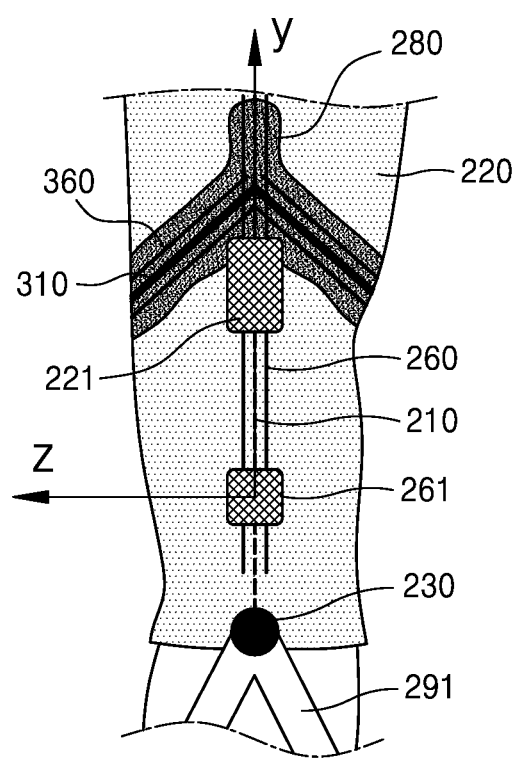
FIG. 12 is a diagram of a first sheath extending below a first sheath fixing unit, according to an embodiment.

Referring to FIG. 12, the first sheath 260 may extend to the front of the kneecap when the wearing portion 220 is worn on the knee. The first sheath 260 is provided to prevent the skin from being pressed by the first wire 210, and therefore, it is desirable that the first sheath 260 extends to the front of the kneecap to minimize the pressure applied by the first wire 210 onto the knee.

In other words, the first sheath 260 may extend below the first sheath fixing unit 250. To prevent the skin from being pressed by the first wire 210, the first sheath 260 may extend from the driver 240 to the wearing portion 220 via the first sheath fixing unit 250.

When the first sheath 260 extends to the wearing portion 220, the first sheath 260 may be fixed to the wearing portion 220. In an embodiment, a first covering member 261 may be put on the first sheath 260 and then sewn onto the wearing portion 220, so that the first sheath 260 may be fixed to the wearing portion 220.

The suit type exoskeleton 200 for knee power assistance may further include an ankle portion 290 worn on an ankle. The ankle portion 290 may be worn on a user's ankle, covering the ankle.

Figure 13C:
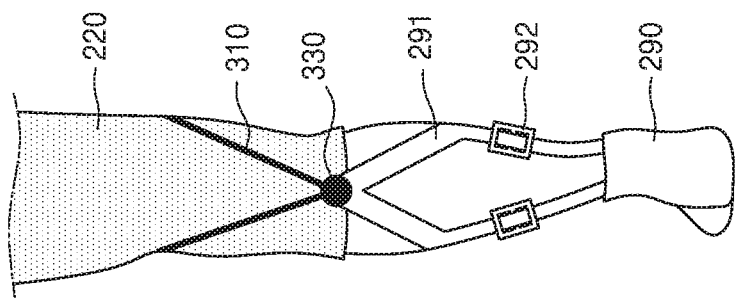
FIG. 13C is a diagram of an ankle portion connected to a wearing portion through a strap, according to an embodiment.
Figure 13B:
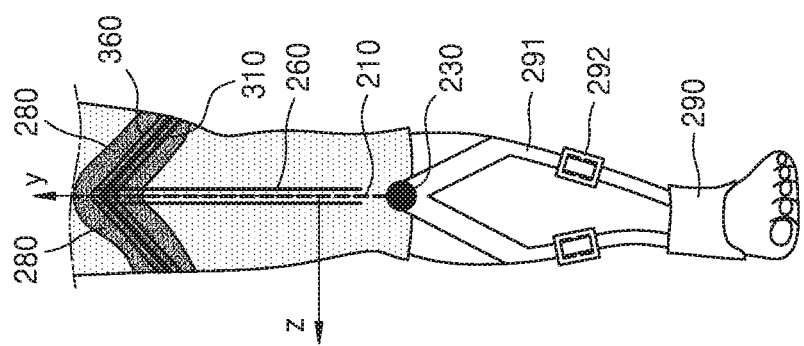
FIG. 13B is a diagram of an ankle portion connected to a wearing portion through a strap, according to an embodiment.
Figure 13A:
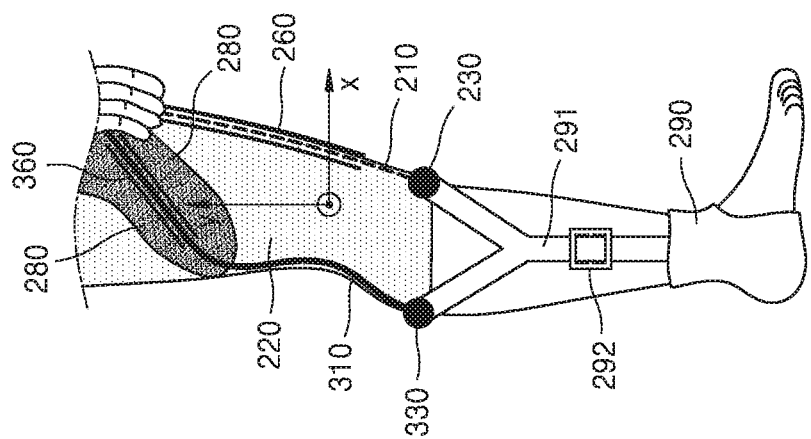
FIG. 13A is a diagram of an ankle portion connected to a wearing portion through a strap, according to an embodiment.

The ankle portion 290 may be provided to support the wearing portion 220. Referring to FIGS. 13A through 13C, an upper portion of ankle portion 290 may be connected to a lower portion of the wearing portion 220 through a strap 291. In detail, the strap 291 extends from the upper portion of the ankle portion 290 to the lower portion of the wearing portion 220. The strap 291 may extend in a plurality of strands.

The strap 291 may be connected directly to the lower portion of the wearing portion 220 or to the first and second controllers 230 and 330 attached to the wearing portion 220. When the lower portion of the wearing portion 220 is connected to the upper portion of the ankle portion 290 using the strap 291, the wearing portion 220 may be supported by the ankle portion 290.

When the power of the driver 240 is transmitted to the wearing portion 220 through the first and second wires 210 and 310, the wearing portion 220 may be twisted or displaced from an original location due to the power of the driver 240. When the location of the wearing portion 220 is changed, it may be hard to accurately transmit the power for assisting the muscular strength of the knee.

The ankle portion 290 may prevent the wearing portion 220 from being twisted or displaced due to the power of the driver 240 by supporting the wearing portion 220 through the strap 291. Since the ankle portion 290 and the wearing portion 220 are worn on the body to cover it, the ankle portion 290 and the wearing portion 220 may include an elastic material. However, the strap 291 may include a nonelastic material that does not stretch.

When the strap 291 includes an elastic material that stretches, the wearing portion 220 may not be effectively supported using the ankle portion 290, and the strap 291 may also be twisted when the wearing portion 220 is twisted. Therefore, it is desirable that the strap 291 includes a nonelastic material that does not stretch. The strap 291 may include nylon webbing.

The strap 291 may include a strap adjuster 292 which may adjust the length of the strap 291. The strap adjuster 292 that may adjust the length of the strap 291 may adjust the length of the strap 291 according to a distance between the ankle portion 290 and the wearing portion 220.

Since body size varies in humans, the distance between the ankle portion 290 and the wearing portion 220 may also vary in humans. For this reason, the strap adjuster 292 may be provided to adjust the length of the strap 291. The strap adjuster 292 may be any device that may adjust the length of the strap 291 and involves publically known techniques, and thus a description thereof will be omitted.

Effects of a suit type exoskeleton adjustable to a user's body size and a suit type exoskeleton for knee power assistance, according to embodiments of the present disclosure, will be described below.

Since body size varies in humans, it is necessary to adjust a suit type exoskeleton to a user's body size when the user wears the suit type exoskeleton. According to the related art, a suit type exoskeleton uses an adjustment device capable of adjusting each part of the suit type exoskeleton to a corresponding part of the body to adjust the suit type exoskeleton to the body size. However, such adjustment device causes inconvenience to the user of the suit type exoskeleton, and a wire for transmitting power may not be correctly located.

According to embodiments of the present disclosure, the locations of wires and ends of wire sheaths may be controlled according to body size, using the controller 130 and the sheath fixing unit 150 which are attachable to and detachable from the wearing portion 120 or the first and second controllers 230 and 330 and the first and second sheath fixing units 250 and 350, which are attachable to and detachable from the wearing portion 220, and therefore, the wires may be located in correct positions which are supposed to receive power.

According to the related art, a suit type exoskeleton does not have a separate device for controlling the length of a wire. However, according to an embodiment of the present disclosure, the lengths of wires may be controlled using the controller 130, the first controller 230, and the second controller 330.

According to the related art, a suit type exoskeleton for knee power assistance has a wire that extends in the back of the knee and thus causes inconvenience to a user. However, according to an embodiment of the present disclosure, a suit type exoskeleton for knee power assistance has two second wires 310 that extend from the front of the knee to the calf in the back of the knee via the lateral sides, respectively, of the knee, and therefore, a user may easily wear the suit type exoskeleton.

According to an embodiment of the present disclosure, two second wires 310 are symmetrical with respect to the center of the calf in the back of the knee, and therefore, the wearing portion 220 may be prevented from being twisted by the power of the driver 240. In addition, since each of the second wires 310 extends to an upper end of the calf in the back of the knee via a lateral side of the knee, as shown in FIG. 13A, a moment arm between the front and the back of the knee may be increased, and therefore, the power of the driver 240 may be effectively transmitted to the back of the knee.

As described above, according to an embodiment, a suit type exoskeleton adjustable to a user's body size enables the locations of a wire and an end of a wire sheath to be controlled using a controller and a sheath fixing unit, which are attachable to and detachable from a wearing portion, so that the wire may be located in a correction position so as to effectively transmit the power of a driver and the length of the wire may be adjusted to the body size.

In addition, a suit type exoskeleton for knee power assistance has a second wire extending from the front of a knee to a calf in the back of the knee via a lateral side of the knee, thereby increasing wearing convenience.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An exoskeleton for knee power assistance, exoskeleton comprising:
   a first wire including a first end and a second end opposite to the first end;
   a second wire including a first end and a second end opposite to the first end;
   a wearing portion configured to be worn on a knee from a front of the knee to assist with muscular strength of the knee;
   a first controller directly connected to the first end of the first wire and removably coupled to an outer surface of the wearing portion to be located in the front of the knee when the wearing portion is worn on the knee, the first controller configured to control a length of the first wire;
   a second controller directly connected to the first end of the second wire and removably coupled to the outer surface of the wearing portion to be located on a calf in a back of the knee when the wearing portion is worn on the knee, the second controller configured to control a length of the second wire; and
   a driver coupled to the second end of the first wire and the second end of the second wire and configured to provide power to the first wire and the second wire.

2. The exoskeleton of claim 1, wherein two second controllers, which includes the second controller, are coupled to the outer surface of the wearing portion, the second wire is coupled to each of the two second controllers, and the second wire extends from the front of the knee to the calf in the back of the knee via a lateral side of the knee when the wearing portion is worn on the knee.

3. The exoskeleton of claim 2, further comprising:
   a first sheath fixing unit removably coupled to the outer surface of the wearing portion to be located in the front of the knee when the wearing portion is worn on the knee and comprising a first through hole through which the first wire passes; and
   a second sheath fixing unit removably coupled to the outer surface of the wearing portion to be located in the front of the knee when the wearing portion is worn on the knee and comprising a second through hole through which the second wire passes.

4. The exoskeleton of claim 3, further comprising:
a first sheath having a first end coupled to the driver, opposite second end opposite to the first end of the first sheath and coupled to the first sheath fixing unit, the first sheath having a tubular shape; and
a second sheath having a first end coupled to the driver, opposite second end opposite to the first end of the second sheath and coupled to the second sheath fixing unit, and the second sheath having a tubular shape,
wherein the first wire passes through an inside of the first sheath and extends from the first sheath fixing unit to the driver, and the second wire passes through an inside of the second sheath and extends from the second sheath fixing unit to the driver.

5. The exoskeleton of claim 4, wherein the first sheath extends to a front of a kneecap of the knee when the wearing portion is worn on the knee.

6. The exoskeleton of claim 3, further comprising:
a plurality of fixing portions attached to the wearing portion,
wherein the fixing portions are configured to cover the first controller, the second controllers, the first sheath fixing unit, and the second sheath fixing unit when attached to the wearing portion.

7. The exoskeleton of claim 1, wherein the first wire is connected to the second wire inside the driver.

8. The exoskeleton of claim 1, further comprising:
a buttress,
wherein the buttress includes,
a first supporting portion fixed to the wearing portion to be located in the front of the knee when the wearing portion is worn on the knee, and
a second supporting portion extending in two branches from the first supporting portion and fixed to the wearing portion to be located in lateral sides of the knee when the wearing portion is worn on the knee.

9. The exoskeleton of claim 1, further comprising:
an ankle portion configured to be worn on an ankle,
wherein an upper portion of the ankle portion is connected to a lower portion of the wearing portion through a strap.

10. The exoskeleton of claim 9, wherein the strap comprises a strap length adjustment ring configured to adjust a length of the strap.

11. The exoskeleton of claim 1, wherein
the first controller is configured to control the length of the first wire by winding or unwinding the first wire, and
the second controller is configured to control the length of the second wire by winding or unwinding the second wire.

12. The exoskeleton of claim 1, wherein
the first wire extends in the front of the knee, and
the second wire extends from the front of the knee to the calf in the back of the knee via a lateral side of the knee.

13. The exoskeleton of claim 12, wherein the first wire and the second wire are connected to each other to operate in antagonism with each other.

14. The exoskeleton of claim 1, wherein the driver is directly connected to both the second end of the first wire and the second end of the second wire.

15. The exoskeleton of claim 1, wherein the first controller and the second controller are configured to manually adjust lengths of the first wire and the second wire, respectively, by winding and unwinding.

* * * * *